(12) United States Patent
Oh et al.

(10) Patent No.: US 11,878,574 B2
(45) Date of Patent: Jan. 23, 2024

(54) SLIM AIR VENT FOR VEHICLE (71) Applicants: Hyundai Motor Company, Seoul (KR); Kia Corporation, Seoul (KR); ITW EF&C Korea LLC, Incheon (KR)

(72) Inventors: Seok Jun Oh, Gwacheon-si (KR); Dong Won Yeon, Daejeon (KR); Jeong Woong Son, Seoul (KR); Byung Jo Kim, Incheon (KR); Wan Su Joun, Incheon (KR); Chun Ha Kim, Seoul (KR)

(73) Assignees: HYUNDAI MOTOR COMPANY, Seoul (KR); KIA CORPORATION, Seoul (KR); ITW EF&C KOREA LLC, Incheon (KR)

( * ) Notice: Subject to any disclaimer, the term of this patent is extended or adjusted under 35 U.S.C. 154(b) by 0 days.

(21) Appl. No.: 17/728,432

(22) Filed: Apr. 25, 2022

(65) Prior Publication Data

US 2023/0037011 A1 Feb. 2, 2023

(30) Foreign Application Priority Data

Jul. 28, 2021 (KR) .................. 10-2021-0099299

(51) Int. Cl.
*B60H 1/34* (2006.01)
(52) U.S. Cl.
CPC ... *B60H 1/3421* (2013.01); *B60H 2001/3464* (2013.01)
(58) Field of Classification Search
CPC ............. B60H 1/3421; B60H 2001/3464

USPC ........................................... 454/155
See application file for complete search history.

(56) References Cited

U.S. PATENT DOCUMENTS

| 2010/0093269 | A1 | 4/2010 | Sakaguchi et al. |
| 2015/0174989 | A1* | 6/2015 | Oe .................... F24F 13/14 454/152 |
| 2017/0057326 | A1 | 3/2017 | Cho |
| 2017/0259649 | A1* | 9/2017 | Shibata ............... B60H 1/3421 |

(Continued)

FOREIGN PATENT DOCUMENTS

| CN | 205168111 U | 4/2016 |
| EP | 3 663 114 A1 | 6/2020 |

(Continued)

OTHER PUBLICATIONS

U.S. Office Action dated Oct. 4, 2023, issued in corresponding U.S. Appl. No. 17/475,767.

*Primary Examiner* — Avinash A Savani
*Assistant Examiner* — Dana K Tighe
(74) *Attorney, Agent, or Firm* — Morgan, Lewis & Bockius LLP (57) ABSTRACT

A slim air vent for a vehicle includes an inner wing disposed in a duct to horizontally rotate during manipulation of a knob, an outer wing and a support wing disposed in the duct to vertically rotate during the manipulation of the knob, a knob pin horizontally penetrating through the knob to rotate together with the knob during the vertical rotation of the knob and to guide the knob during the horizontal movement of the knob, and a link mechanism provided to connect one end of the knob pin and the outer wing to vertically rotate the outer wing and the support wing during rotation of the knob pin according to the vertical rotation of the knob.

12 Claims, 9 Drawing Sheets

(56) References Cited

U.S. PATENT DOCUMENTS

| | | | | |
|---|---|---|---|---|
| 2018/0354346 A1* | 12/2018 | Demerath | ............ | B60H 1/3421 |
| 2019/0092138 A1* | 3/2019 | Lee | ........................ | B60H 1/247 |
| 2019/0366808 A1 | 12/2019 | Kang | | |
| 2020/0094656 A1* | 3/2020 | Kim | ..................... | B60H 1/3421 |
| 2021/0206238 A1* | 7/2021 | Munoz | ................. | B60H 1/3421 |
| 2021/0260969 A1* | 8/2021 | Kim | ..................... | B60H 1/3421 |
| 2022/0032738 A1* | 2/2022 | Leopold | ............... | B60H 1/3421 |
| 2022/0314747 A1* | 10/2022 | Lee | ..................... | B60H 1/3421 |

FOREIGN PATENT DOCUMENTS

| | | |
|---|---|---|
| JP | WO2013/128763 A1 | 7/2015 |
| JP | 2017-206068 A | 11/2017 |
| KR | 20-0300867 Y1 | 1/2003 |
| KR | 10-201-80065898 A | 6/2018 |
| KR | 10-2019-0118356 A | 10/2019 |
| KR | 10-2046809 B1 | 11/2019 |
| KR | 10-2019-0138487 A | 12/2019 |
| KR | 10-2083321 B1 | 4/2020 |

\* cited by examiner

SLIM AIR VENT FOR VEHICLE

CROSS REFERENCE TO RELATED APPLICATION

The present application claims the benefit of priority to Korean Patent Application No. 10-2021-0099299, filed Jul. 28, 2021, the entire contents of which are incorporated herein by this reference.

TECHNICAL FIELD

The present disclosure relates to a slim air vent for a vehicle and, more particularly, to a slim air vent for a vehicle in which the vertical height is reduced while satisfying performance standards for air direction and volume.

BACKGROUND

In general, a vehicle dashboard is provided with an air vent for discharging cold or warm air into the vehicle interior.

The air vent has inner wings that rotate in the horizontal direction and outer wings that rotate in the vertical direction to discharge the cold or warm air generated from an air conditioner in the horizontal direction and vertical direction in the vehicle interior through rotating of the inner wings and outer wings.

However, the conventional air vent has a structure in which a plurality of outer wings rotating in the vertical direction protrude outside of a duct, through which air flows, and are stacked vertically in a mutually spaced-apart manner so that as viewed from the vehicle interior, due to the outer wings being vertically stacked while protruding outside of the duct, the vertical length is long (the vertical height is high) and the horizontal length is equal to the vertical length, causing a drawback in that it is difficult to pursue a smart image and a high-quality image (for example, an aesthetically pleasing image or design) because the external size is large and clunky.

In addition, the conventional air vent has another drawback in that the outer wings protrude outside of the duct so that the outer wings are exposed to the interior, resulting in poor appearance.

In addition, the conventional air vent has a further drawback in that vertical rotating of the outer wings changes the cross-sectional area of an outlet, through which air is discharged into the interior, and thus a volume of air discharged into the interior. This makes it difficult to maintain the volume of discharged air to be constant, thereby degrading the performance of the air vent.

The foregoing is intended merely to aid in the understanding of the background of the present disclosure, and is not intended to mean that the present disclosure falls within the purview of the related art that is already known to those skilled in the art.

SUMMARY

Accordingly, an objective of the present disclosure is to provide a slim air vent for use in a vehicle and in which an inner wing, an outer wing, and a support wing, which rotate for control of air direction while satisfying performance standards for air direction and volume, are all disposed inside of a duct so as to provide a compact and slim sized air vent according to a decrease in the vertical height, and to further provide a smart image and a high-quality image to the air vent.

Another objective of the present disclosure is to provide a slim air vent for a vehicle in which an inner wing, an outer wing, and a support wing are all disposed inside of a duct so as to eliminate the phenomenon that the outer wing protrudes outside of the duct so that the outer wing is exposed to the vehicle interior, thereby improving the appearance of the air vent.

A further objective of the present disclosure is to provide a slim air vent for a vehicle in which the cross-sectional area of an outlet of the air vent, through which air flows into the vehicle interior, is always kept constant regardless of rotating of the outer wing so that a volume of air fed into the vehicle interior is also kept constant, thereby improving the performance of the air vent.

A further objective of the present disclosure is to provide a slim air vent for a vehicle in which the degree of protrusion of a knob protruding into the vehicle interior is kept constant when the knob rotates in the vertical direction, thereby maintaining a constant volume of air fed into the vehicle interior and improving the appearance of the air vent.

In order to accomplish the above objectives, according to an aspect of the present disclosure, there is provided a slim air vent for a vehicle, the air vent including: an inner wing disposed in a duct so as to rotate in a horizontal direction during manipulation of a knob; an outer wing and a support wing disposed on a rear side of the inner wing in the duct so as to rotate in a vertical direction during the manipulation of the knob; a knob pin horizontally penetrating through the knob so as to rotate together with the knob during a vertical rotation of the knob and to guide a movement of the knob during a horizontal movement of the knob; and a link mechanism to connect one end of the knob pin and the outer wing so as to rotate the outer wing and the support wing in the vertical direction during rotation of the knob pin according to the vertical rotation of the knob.

In an embodiment, spacers may be fixedly disposed on opposite lateral sides of the duct, respectively, such that opposite lateral sides of the outer wing and the support wing are vertically rotatably coupled to the spacers.

In an embodiment, a front side of the outer wing and a rear side of the support wing may be rotatably connected, and the support wing may be such that the length is variable during rotation of the outer wing.

In an embodiment, the outer wing may include an upper outer wing part and a lower outer wing part vertically spaced apart from each other, and the upper outer wing part and the lower outer wing part may be connected to the knob pin by the link mechanism, so that the upper outer wing part and the lower outer wing part rotate together during the rotation of the knob pin.

In an embodiment, the support wing may include an upper support wing part rotatably connected to the upper outer wing part; and a lower support wing part rotatably connected to the lower outer wing part; wherein the upper support wing part and the lower support wing part are vertically spaced apart from each other.

In an embodiment, the upper support wing part and the lower support wing part may have an assembly structure of a cylinder and a cylinder rod moving along the cylinder, so that a length of the upper support wing part and a length of the lower support wing part are individually variable during vertical rotation of the outer wing.

In an embodiment, the knob may include a coupling part coupled to a vertical rod of the inner wing, wherein the coupling part is operated to vertically move along the vertical rod during the vertical rotation of the knob and to horizontally move the vertical rod during the horizontal movement of the knob to horizontally rotate the inner wing.

In an embodiment, the knob may include an inner knob part integrally coupled with the knob pin so as to rotate with the knob pin, and an outer knob part manipulated by a user and surrounding the inner knob part and through which the knob pin penetrates, whereby the inner knob part and the knob pin rotate together during a vertical rotation of the outer knob part, and the inner knob part and the knob pin are fixed and only the outer knob part moves in the horizontal direction during a horizontal movement of the outer knob part.

In an embodiment, the slim air vent may include a spring and a rubber to regulate a gap between the inner knob part and the outer knob part.

In an embodiment, the knob pin may be covered by a decorative cover and a back cover, wherein the decorative cover and the back cover are coupled to each other, and the decorative cover is such that opposite lateral sides thereof are fixed to the duct and the decorative cover is exposed to the vehicle interior, at an intermediate position in the vertical direction of the duct.

In an embodiment, the slim air vent may include a rubber to contact the decorative cover to regulate a gap between the outer knob part and the decorative cover and a manipulating force of the knob.

In an embodiment, the link mechanism may include a first link coupled to the one end of the knob pin, and a second link coupled to the first link and having opposite ends coupled to the upper outer wing part and the lower outer wing part, respectively, whereby during the rotation of the knob pin, the first link rotates, and during the rotation of the first link, the second link rotates the upper outer wing part and the lower outer wing part together while moving upward or downward along the rotation direction of the first link.

In an embodiment, the outer wing and the support wing may be rotatably coupled to spacers fixedly disposed on opposite lateral sides of the duct, respectively, the first link and the second link may, at an outside of the spacers, connect the one end of the knob pin penetrating through the spacers and guide protrusions of the upper outer wing part and lower outer wing part, and each of the spacers may include a first guide hole and a second guide hole spaced apart from each other in the vertical direction to guide the movement of the upper outer wing part and the lower outer wing part during the vertical movement of the second link according to the rotation of the first link.

According to the configuration of the slim air vent for a vehicle, the inner wing, the outer wing, and the support wing are all disposed inside of the duct, while satisfying performance standards for air direction and volume, directivity, noise, and airtightness, so as to provide a compact and slim sized air vent according to a decrease in the vertical height, and to further provide a smart image and a high-quality image to the air vent so that the air vent is applicable to a vehicle, especially an autonomous vehicle with a smart image.

Further, according to the configuration of the slim air vent for a vehicle, the inner wing, the outer wing, and the support wing are all disposed inside of the duct, having the effect of concealing components of the air vent and thus improving the appearance of the air vent.

Further, according to the configuration of the slim air vent for a vehicle, the cross-sectional area of the rear flow path is always kept constant regardless of vertical rotating of the upper and lower outer wings so that a volume of air fed into the vehicle interior is also kept constant, thereby improving the performance of the air vent.

Further, according to the configuration of the slim air vent for a vehicle, the function of the air vent is implemented by a user's manual manipulation of a single knob located in the center of the outer wing, thereby improving the user's manipulation convenience through the manipulation of the single knob, and obtaining cost reduction and universal application through manual manipulation of the knob, particularly.

Further, according to the configuration of the slim air vent for a vehicle, the degree of protrusion of the knob protruding into the vehicle interior is kept constant when the knob rotates in the vertical direction, thereby maintaining a constant volume of air fed into the vehicle interior and improving the appearance of the air vent.

DETAILED DESCRIPTION

Specific structural or functional descriptions of the embodiments of the present disclosure disclosed herein are merely exemplified for the purpose of illustrating the embodiments according to the present disclosure, and the embodiments of the present disclosure are implemented in various forms, and may not be construed as being limited to the embodiments described in this specification or application.

Since the embodiments according to the present disclosure can be diversely modified into various forms, specific embodiments will be illustrated and described in detail in the drawings and the description of the present disclosure. However, this is not intended to limit the embodiments according to the concept of the present disclosure to specific disclosure forms, but should be understood to include all modifications, equivalents, or substitutes included in the spirit and scope of the present disclosure.

It will be understood that although the terms "first," "second," etc. may be used herein to describe various elements, these elements should not be limited by these terms. These terms are only used to distinguish one element from another element. Thus, a first element discussed below could be termed a second element and vice versa without departing from the nature of the present disclosure.

It will be understood that when an element is referred to as being "connected" or "coupled" to another element, it can be directly connected or coupled to the other element or intervening elements may be present therebetween. In contrast, when an element is referred to as being "directly connected" or "directly coupled" to another element, there are no intervening elements present. Other expressions describing the relationship between the components, such as "between" and "immediately between" or "neighboring" and "directly neighboring" should also be interpreted in the same manner.

The terminology used herein is for the purpose of describing particular embodiments only and is not intended to limit the disclosure. As used herein, the singular forms "a," "an," and "the" are intended to include the plural forms as well, unless the context clearly indicates otherwise. It will be further understood that the terms "comprises" and/or "comprising," or "includes" and/or "including," when used in this specification, specify the presence of stated features, integers, steps, operations, elements, components or combinations thereof, but do not exclude the presence or addition of one or more other unclaimed features, integers, steps, operations, elements, components, or combinations thereof.

Unless otherwise defined, the meaning of all terms including technical and scientific terms used herein is the same as that commonly understood by one of ordinary skill in the art to which the present disclosure pertains. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

In addition, the terms "upper," "lower," "vertical," "horizontal," "bottom," "upward," "downward," and the like may describe features of the embodiments with reference to the positions of features as displayed in the figures.

A control unit (controller) according to an exemplary embodiment of the present disclosure includes a non-volatile memory (not shown) configured to store an algorithm configured to control the operation of various components of a vehicle or data relating to software instructions for reproducing the algorithm, and a processor (not shown) configured to perform operations described below using data stored in the corresponding memory. Here, the memory and the processor may be implemented as separate chips. Alternatively, the memory and processor may be implemented as a single integrated chip. A processor may take the form of one or more processors.

Hereinafter, a slim air vent for a vehicle according to a preferred embodiment of the present disclosure will be described with reference to the accompanying drawings.

As illustrated in FIGS. 1 to 9, the slim air vent for a vehicle includes a duct 100 for guiding an air flow into the vehicle interior, a plurality of inner wings 200 horizontally rotatably coupled with respect to the duct 100 to horizontally guide the discharge direction of air, spacers 300 fixedly coupled to the left and right sides of the duct 100, respectively, an outer wing 400 located at the rear of the inner wings 200 and whose both left and right ends are vertically rotatably coupled to the spacers 300, respectively, a support wing 500 rotatably coupled to a front end of the outer wing 400 and whose both left and right ends are vertically rotatably coupled to the spacers 300, respectively, such that the length is variable during the rotation of the outer wing 400, a knob 600 coupled to connect the inner wings 200 and the outer wing 400, a knob pin 700 horizontally penetrating through the knob 600 so that the knob pin rotates together with the knob 600 during vertical rotation of the knob 600, and guides the movement of the knob 600 during the horizontal rotation of the knob 600, and a link mechanism 800 provided to connect one end of the knob pin 700 and the outer wing 400 and to operate to vertically rotate the outer wing 400 and the support wing 700 when the knob pin 700 is rotated according to the vertical rotation of the knob 600.

The slim air vent for a vehicle according to the present disclosure has the configuration in which the inner wings 200, the outer wing 400, and the support wing 500 are all disposed inside of the duct 100, so that as compared to the conventional air vent, the vertical height of the air vent can be greatly reduced to provide a slim sized air vent and to further provide a smart image and a high-quality image to the air vent so that the air vent is advantageously applicable to a vehicle, especially an autonomous vehicle with a smart image.

Further, the inner wings 200, the outer wing 400, and the support wing 500 are all disposed inside of the duct 100, having the effect of concealing components of the air vent and thus improving the appearance of the air vent.

The inner wing 200 is composed of a plurality of pieces disposed left and right, and the plurality of inner wings 200 are integrally connected through linkages 210 coupled to the upper and lower ends, respectively. The linkages 210 are rotatably connected to the duct 100 such that when any one of the inner wings 200 rotates left and right, the rest inner wings 200 connected through the linkages 210 also rotate left and right at the same time.

The inner wing 200 and the outer wing 400 may be referred to as a vertical wing and a horizontal wing, respectively, depending on the installed direction.

According to the present disclosure, the spacers 300 are fixedly coupled to the left and right sides of the duct 100 so as to face the side surfaces of the outer wing 400, respectively.

The spacer 300 also serves to prevent air leakage by blocking an unnecessary gap between the side surfaces of the duct 100 and the outer wing 400, thereby eliminating whistle noise caused by air leakage.

The outer wing 400 includes an upper outer wing part 410 and a lower outer wing part 420 that are vertically spaced apart from each other.

Guide protrusions 411 and 421 are respectively formed on the left and right sides of the upper outer wing part 410 and the lower outer wing part 420, and each of the spacers 300 has a first guide hole 310 and a second guide hole 320, which are arranged in a vertically spaced-apart manner. The first and second guide holes extend along a rotation radius of the upper outer wing part 410 and a rotation radius of the lower outer wing part 420, respectively, and the guide protrusions 411 and 421 are inserted through and moved along the first and second guide holes.

The guide protrusions 411 and 421 and the first and second guide holes 310 and 320 serve to guide the vertical rotation of the outer wing 400, and furthermore to connect the duct 100 and the outer wing 400 through the spacers 300, thereby making the coupling structure of the outer wing 400 more firmly.

Hinge protrusions 412 and 422 are respectively formed to protrude from left and right sides on the respective rear sides of the upper and lower outer wing parts 410 and 420, and the spacers 300 are provided with hinge holes into which the hinge protrusions 412 and 422 are respectively coupled, thereby providing the structure in which the upper and lower outer wing parts 410 and 420 vertically rotate together with respect to the spacers 300 by the coupling of the hinge protrusions 412 and 422 into the hinge holes.

The upper and lower outer wing parts 410 and 420 are connected with the knob pin 700 through the link mechanism 800, so that the upper and lower outer wing parts 410 and 420 rotate together during the rotation of the knob pin 700.

The support wing 500 includes an upper support wing part 510 that is rotatably connected to the front side of the upper outer wing part 410 and whose hinge protrusions 511 formed on the front left and right sides are coupled into hinge holes formed in the spacers 300 so as to vertically rotate with respect to the spacers 300, and a lower support wing part 520 that is rotatably connected to the front side of the lower outer wing part 420 and whose hinge protrusions 521 formed on the front left and right sides are coupled into hinge holes formed in the spacers 300 so as to vertically rotate with respect to the spacers 300.

In the duct 100, the inner wings 200 are located at the most forward position, and the upper support wing part 510 and the lower support wing part 520 are vertically symmetrically positioned on the rear side of the inner wings 200 such that the rear side of the upper support wing part 510 is connected to the upper outer wing part 410 and the rear side of the lower support wing part 520 is connected to the lower outer wing part 420, wherein the upper outer wing part 410 and the lower outer wing part 420 is vertically symmetrically positioned.

Therefore, air flowing through the inner wings 200 through the duct 100 is fed to the vehicle interior through a front flow path 910 between the upper support wing part 510 and the lower support wing part 520 and a rear flow path 920 between the upper outer wing part 410 and the lower outer wing part 420.

The knob 600 includes a coupling part 610 coupled to a vertical rod 220 of the inner wing 200, and the coupling part 610 vertically moves along the vertical rod 220 during the vertical rotation of the knob 800, and horizontally moves the vertical rod 220 during the horizontal manipulation of the knob 800 to horizontally rotate the inner wings 200.

When the user horizontally moves the knob 600 so that the coupling part 610 horizontally moves the vertical rod 220, the inner wings 200 horizontally rotates with respect to the duct 100 by means of the linkages. Here, the outer wing 400 and the support wing 500 do not rotate, but maintain their positions without rotating in the vertical direction.

Then, when the user vertically rotates the knob 600 so that the manipulating force for the knob 600 is transmitted to the outer wing 400 through the link mechanism 800 so that the outer wing 400 and the support wing 500 vertically rotate together, and at the same time, the coupling part 610 of the knob 600 vertically moves along the vertical rod 220. Thus, the inner wing 200 does not horizontally rotate, but maintains its position.

The embodiment according to the present disclosure has the configuration in which only the partial rear part of the knob 600 protrudes outward (rear, indoor direction) form the duct 100 and is exposed to the vehicle interior, thereby having the effect of concealing components of the air vent and thus improving the appearance of the air vent.

The knob 600 according to the present disclosure includes an inner knob part 620 that is integrally coupled and rotated with the knob pin 700, and an outer knob part 630 surrounding the inner knob part 600 and through which the knob pin 700 penetrates so that the user manipulates the outer knob part.

The inner knob part 620 and the knob pin 700 are integrally coupled with each other by a clip member 640 made of a steel material.

When the outer knob part 630 rotates in the vertical direction by the user's manipulation, the inner knob part 620 and the knob pin 700 also rotate together, and when the outer knob part 630 moves in the horizontal directions by the user's manipulation, the inner knob part 620 and the knob pin 700 are fixed in position, so that only the outer knob part 630 moves in the horizontal direction at this time.

According to the present disclosure, the inner knob part 620 and the outer knob part 630 are provided with a spring 650 and a rubber 660 for regulating a gap between the inner knob part 620 and the outer knob part 630 and the operating force of the knob 600.

Further, the knob pin 700 is surrounded by a decorative cover 710 and a back cover 720, which are coupled to each other.

The decorative cover 710 and the back cover 720 are formed to extend along the longitudinal direction of the knob pin 700 so as to surround most of the knob pin 700 over the entire length except for a portion of both ends of the knob pin 700.

The knob pin 700, the decorative cover 710 and the back cover 720 all penetrate through the knob 600 in the horizontal direction so as to be disposed between the upper outer wing part 410 and the lower outer wing part 410.

In particular, the decorative cover 710 is installed such that the left and right sides thereof are fixed to the duct 100 and exposed to the vehicle interior at an intermediate position in the vertical directions of the duct 100, thereby improving a sense of high-quality image, and furthermore, improving the appearance of the air vent with the coverage of the internal structure of the duct 100 by the decorative cover 710.

The outer knob part 630 is provided with a rubber 670 that is brought into contact with the decorative cover 710 to regulate the gap between the outer knob part 630 and the decorative cover 710 and the operating force of the knob 600.

The link mechanism 800 serves to rotate the outer wing 400 and the support wing 500 in the vertical direction during vertical operation of the knob 600. The link mechanism 800 includes a first link 810 coupled to one end of the knob pin 700, and a second link 820 coupled to the first link 810 and whose both ends are coupled to the upper outer wing part 410 and the lower outer wing part 420.

When the knob pin 700 is rotated by the vertical manipulation of the knob 600, the first link 810 rotates and accordingly the second link 820 rotates the upper outer wing part 410 and the lower outer wing part 420 together while moving upward or downward along the rotational direction of the first link 810. At this time, the upper support wing part 510 and the lower support wing part 520 also rotate together, so that it is possible to control the direction of air fed to the vehicle interior.

The first link 810 and the second link 820 according to the present disclosure are provided to, at the outside of the spacers 300, connect end sides of the knob pin 700 penetrating through the spacers 300 and the guide protrusions 411 of the upper outer wing part 410 and the guide protrusions 421 of the lower outer wing part 420.

Accordingly, each of the spacers 300 has a first guide hole 310 and a second guide hole 320, which are vertically spaced apart from each other to guide the upper outer wing part 410 and the lower outer wing part 420 moving during the vertical movement of the second link 820 according to the rotation of the first link 810.

An upper garnish 930 and a lower garnish 940 are fixedly coupled to the upper and lower sides of the rear surface of the duct 100 facing the vehicle interior, with respect to the knob 600, thereby improving the appearance of the air vent.

Figure 1:
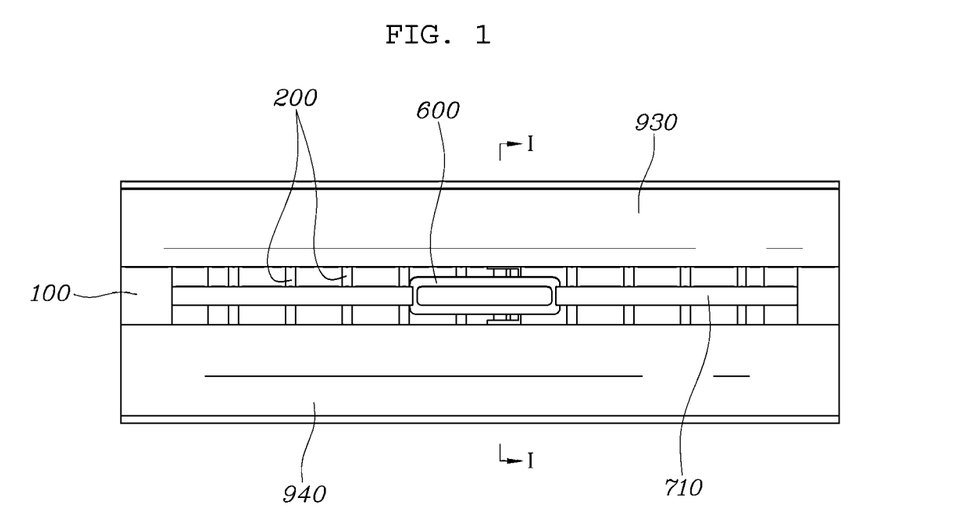
FIG. 1 is a front view illustrating a slim air vent for a vehicle according to an embodiment of the present disclosure.
Figure 2:
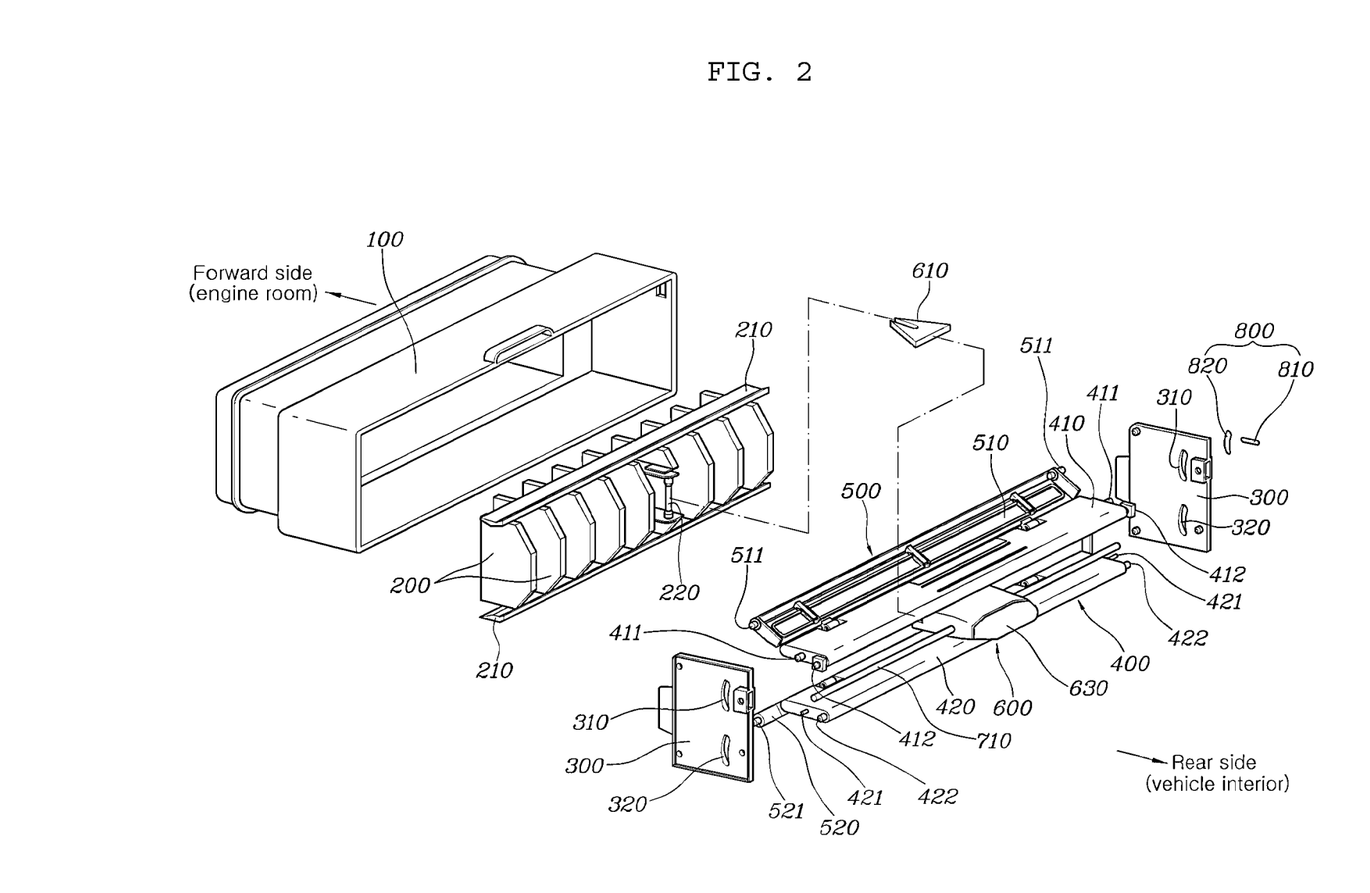
FIG. 2 is an exploded perspective view illustrating the slim air vent according to the embodiment of the present disclosure.
Figure 3:
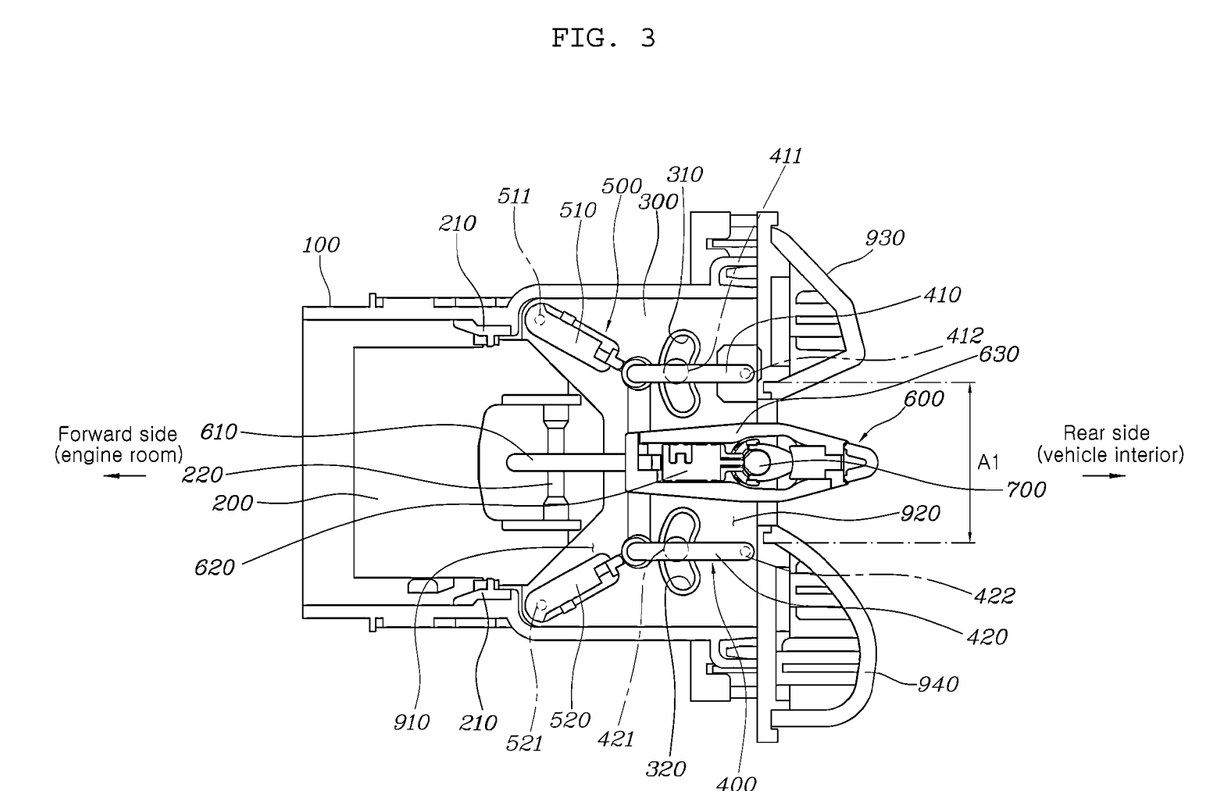
FIG. 3 is a cross-sectional view taken along line I-I in FIG. 1.
Figure 4:
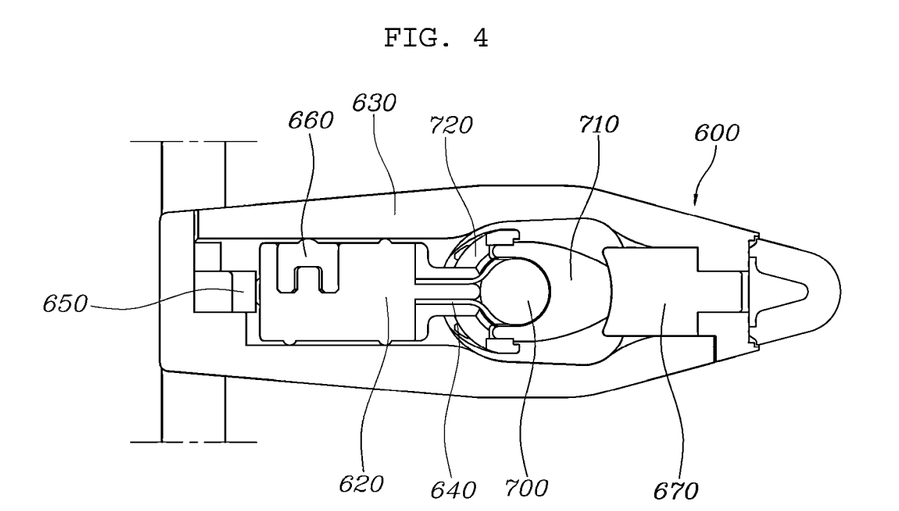
FIG. 4 is a cross-sectional view illustrating a knob according to an embodiment of the present disclosure.
Figure 5:
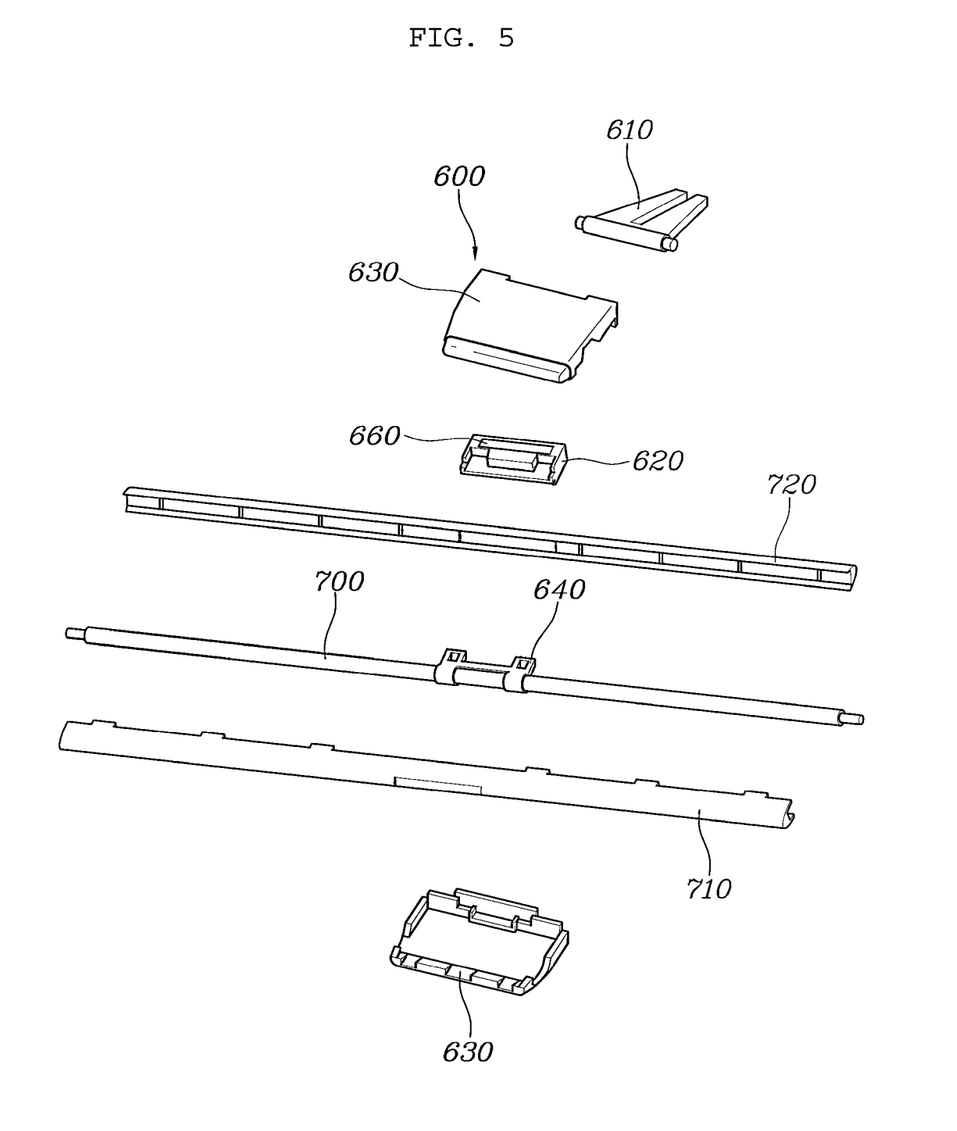
FIG. 5 is an exploded view illustrating a knob and a knob pin according to an embodiment of the present disclosure.
Figure 6:
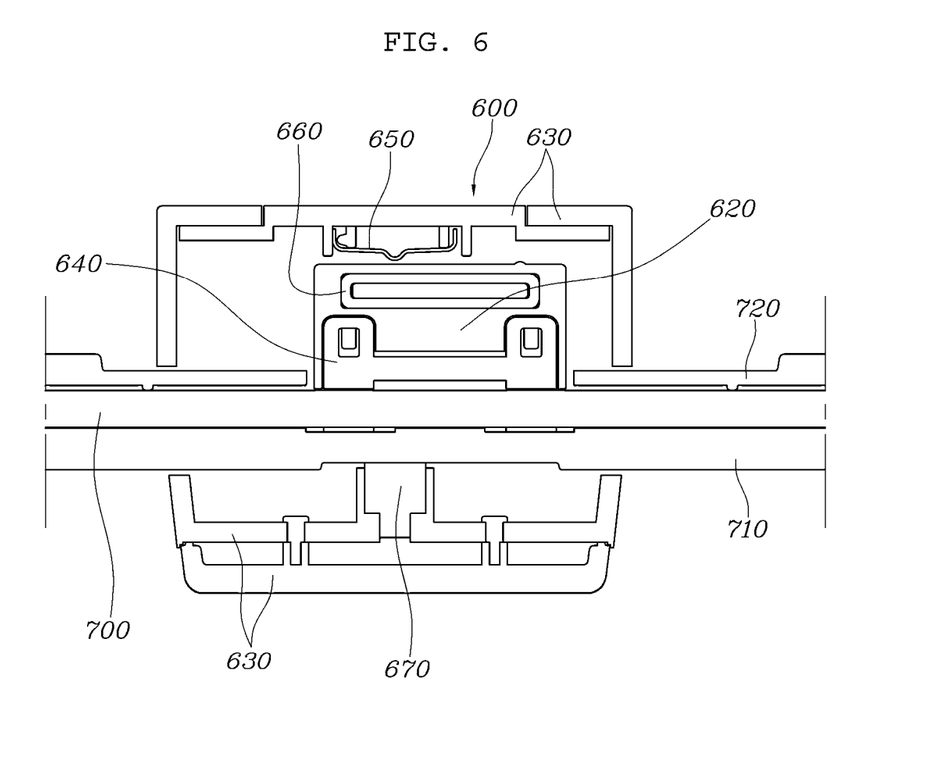
FIG. 6 is a cross-sectional view illustrating the assembled state of FIG. 5.
Figure 7:
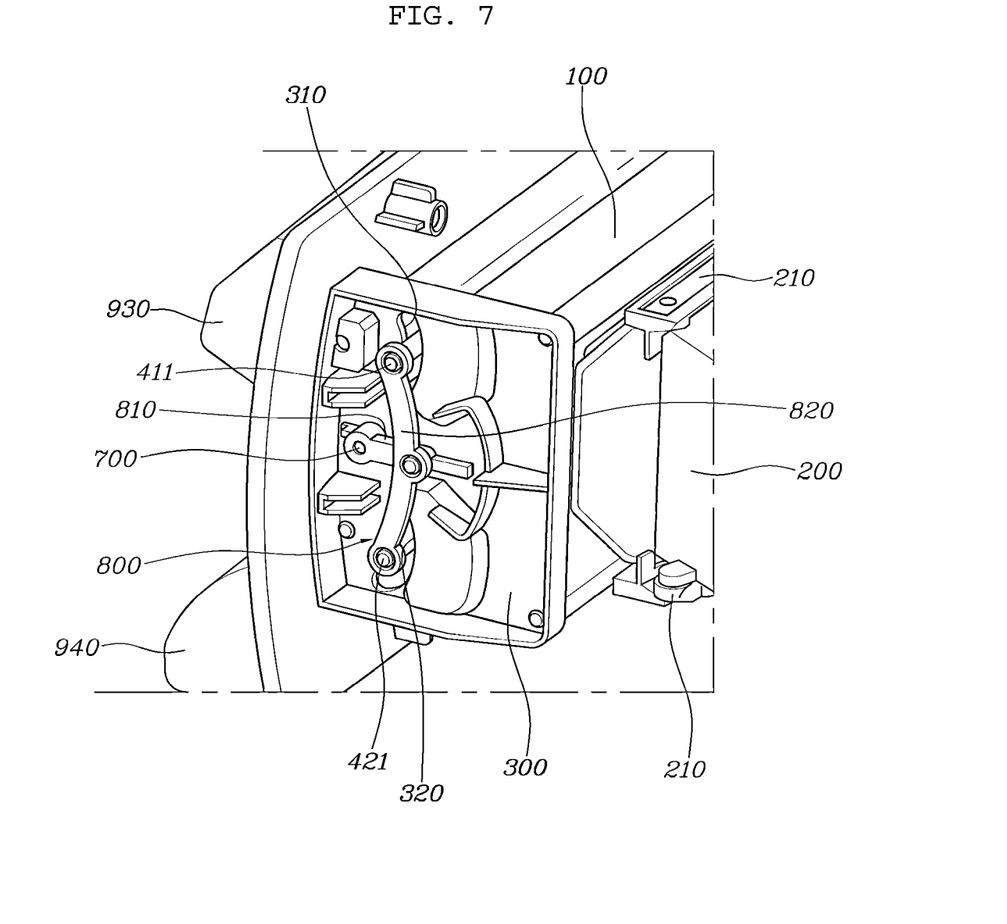
FIG. 7 is a view illustrating the assembly structure of a link mechanism for connecting a knob pin and an outer wing according to an embodiment of the present disclosure.

When the knob 600 is positioned horizontally along the front-rear direction as illustrated in FIG. 3, the upper outer wing part 410 and the upper support wing part 510 positioned above the knob 600 are characteristically vertically symmetrical with the lower outer wing part 420 and the lower support wing part 520 positioned below the knob 600. As a result, after passing through the inner wings 200, the air fed to the vehicle interior through the front flow path 910 and the rear flow path 920 may have improved directivity of airflow.

When the knob 600 is positioned horizontally in the front-rear direction as illustrated in FIG. 3, air passing through the rear flow path 920 is fed toward the front side of a passenger in a vehicle.

In addition, when the knob 600 is positioned horizontally in the front-rear direction as illustrated in FIG. 3, the upper support wing part 510 and the lower support wing part 520 are configured such that the cross-sectional area gradually decreases from the front end to the rear end, so that the front flow path 910 between the upper support wing part 510 and the lower support wing part 520 serves as a nozzle so as to advantageously allow the air to be fed rapidly toward the vehicle interior.

Figure 8:
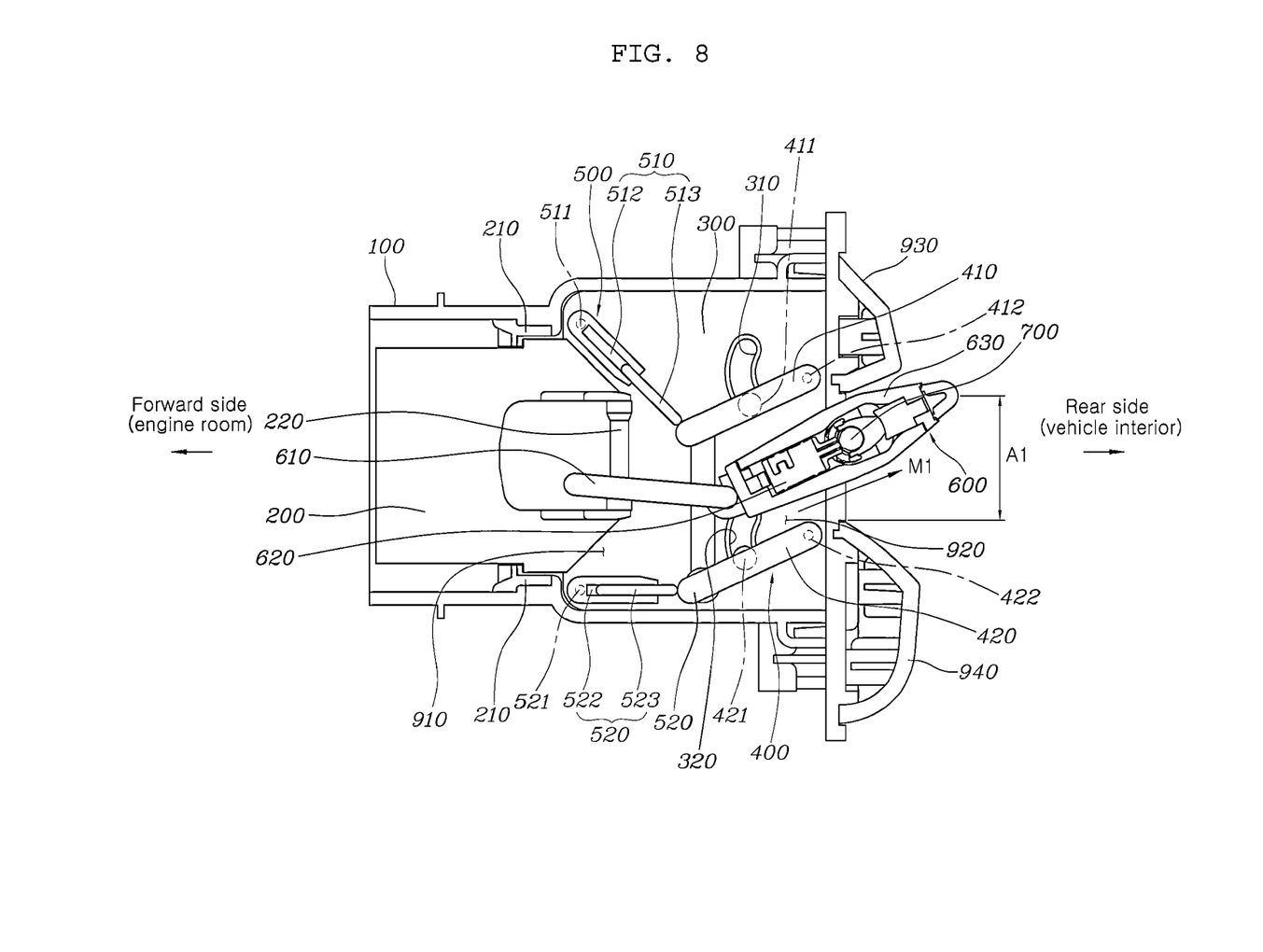
FIGS. 8 to 9 are views illustrating the state in which the knob and the outer wing in FIG. 3 are rotated upward and downward, respectively.

As the knob 600 is moved upward in the state of FIG. 3 so that the upper outer wing part 410 and the lower outer wing part 420 rotate upward as illustrated in FIG. 8, the air passing through the front flow path 910 is fed upward (indicated by arrow M1) through the rear flow path 920.

Figure 9:
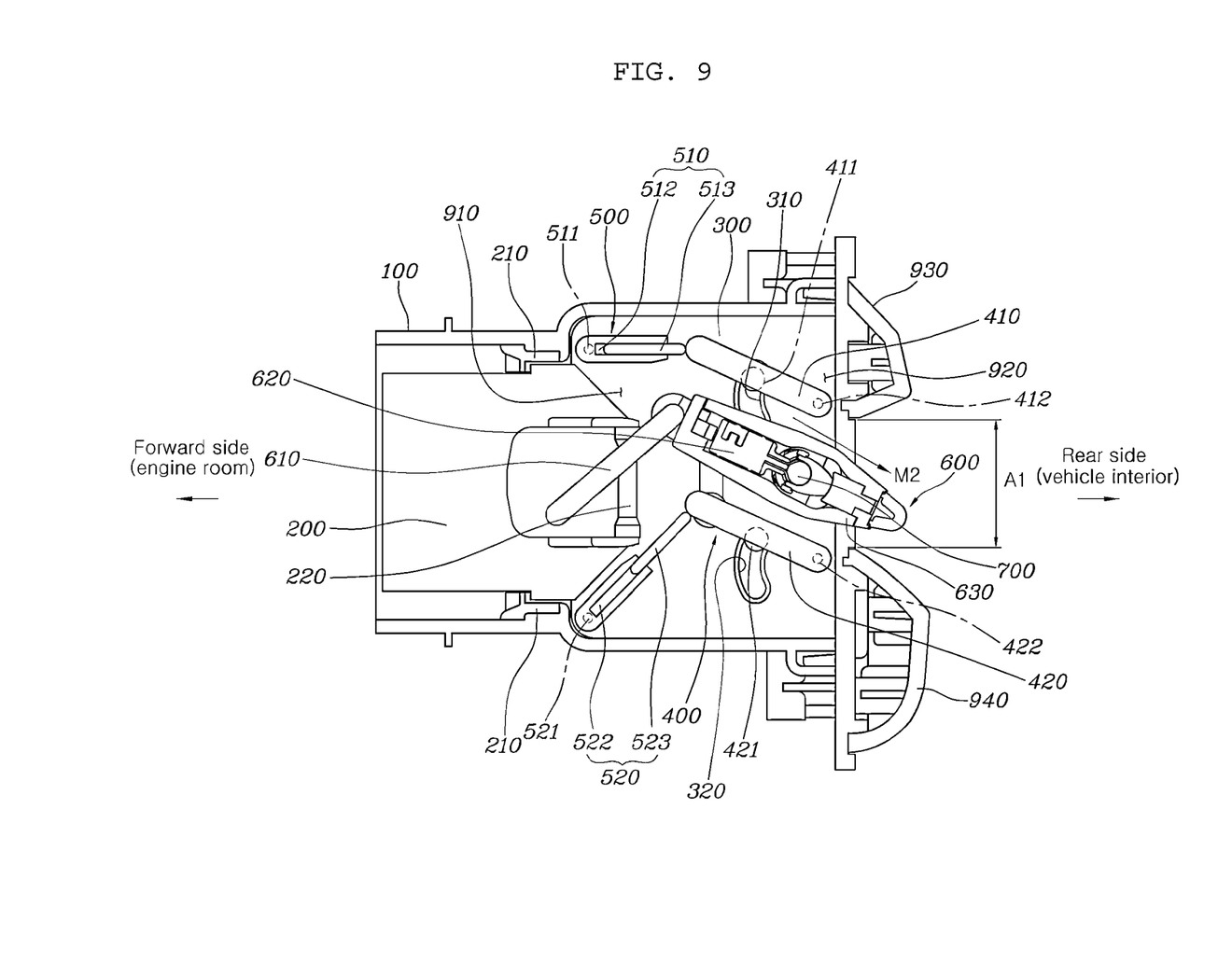

Further, as the knob 600 is moved downward in the state of FIG. 3 so that the upper outer wing part 410 and the lower outer wing part 420 rotate downward as illustrated in FIG. 9, the air passing through the front flow path 910 is fed downward (indicated by arrow M2) through the rear flow path 920.

The embodiment according to the present disclosure is characterized in that the cross-sectional area A1 of the rear flow path 920 is always kept constant regardless of the vertical rotation of the upper outer wing part 410 and the lower outer wing part 420, so that a volume of air fed to the vehicle interior can be constantly maintained, thereby having the effect of contributing to improved performance of the air vent.

That is, the embodiment is characterized in that the cross-sectional area A1 of the rear end of the rear flow path 920, through which air is fed to the vehicle interior, is always kept constant regardless of the vertical rotation of the outer wing 400.

In addition, in the embodiment according to the present disclosure, when the upper outer wing part 410 and the lower outer wing part 420 rotate in the vertical direction, the length of the upper support wing part 510 and the lower support wing part 520 is individually variable.

That is, when the upper outer wing part 410 and the lower outer wing part 420 rotate upward as illustrated in FIG. 8, the upper support wing part 510 is changed to increase its length, whereas when the lower outer wing part 420 rotates in the downward as illustrated in FIG. 9, the lower support wing part 520 is changed to increase the length.

In order to enable the length of the upper support wing part 510 and the lower support wing part 520 to be variable, the upper support wing part 510 and the lower support wing part 520 characteristically have the assembly structure of cylinders 512 and 522 and cylinder rods 513 and 523 moving along the cylinders 512 and 522, respectively.

As described above, the slim air vent for a vehicle according to the present disclosure has the configuration in which the inner wing 200, the outer wing 400, and the support wing 500 are all disposed inside of the duct 100, while satisfying performance standards for air direction and volume, directivity, noise, and airtightness, so as to provide a compact and slim sized air vent according to a decrease in the vertical height, and to further provide a smart image and a high-quality image to the air vent so that the air vent is applicable to a vehicle, especially an autonomous vehicle with a smart image.

Further, the slim air vent for a vehicle according to the present disclosure has the configuration in which the inner wing 200, the outer wing 400, and the support wing 500 are all disposed inside of the duct 100, having the effect of concealing components of the air vent and thus improving the appearance of the air vent.

Further, the slim air vent for a vehicle according to the present disclosure has the configuration in which the cross-sectional area of the rear flow path 920 is always kept constant regardless of vertical rotating of the upper and lower outer wings 410 and 420 so that a volume of air fed into the vehicle interior is also kept constant, thereby improving the performance of the air vent.

Further, the slim air vent for a vehicle according to the present disclosure has the configuration in which the function of the air vent is implemented by a user's manual manipulation of a single knob 600 located in the center of the outer wing 400, thereby improving the user's manipulation convenience through the manipulation of the single knob 600, and obtaining cost reduction and universal application through manual manipulation of the knob 600, particularly.

Further, the slim air vent for a vehicle according to the present disclosure has the configuration in which the degree of protrusion of the knob 600 protruding into the vehicle interior is kept constant when the knob 600 rotates in the vertical direction, thereby maintaining a constant volume of air fed into the vehicle interior and improving the appearance of the air vent.

Although the present disclosure has been described and illustrated with respect to the specific embodiments, it would be obvious to those skilled in the art that various improvements and modifications are possible, without departing from the scope and spirit of the present disclosure as disclosed in the accompanying claims.

What is claimed is:

1. A slim air vent for a vehicle, the air vent comprising:
an inner wing disposed in a duct so as to rotate in a horizontal direction during manipulation of a knob;
an outer wing and a support wing disposed on a rear side of the inner wing in the duct so as to rotate in a vertical direction during the manipulation of the knob;
a knob pin horizontally penetrating through the knob so as to rotate together with the knob during a vertical rotation of the knob and to guide a movement of the knob during a horizontal movement of the knob, wherein the knob pin is covered by a decorative cover and a back cover, the decorative cover and the back cover are coupled to each other, and the decorative cover is such that opposite lateral sides thereof are fixed to the duct and the decorative cover is exposed to a vehicle interior, at an intermediate position in the vertical direction of the duct; and a link mechanism to connect one end of the knob pin and the outer wing so as to rotate the outer wing and the support wing in the vertical direction during rotation of the knob pin according to the vertical rotation of the knob.

2. The slim air vent for a vehicle according to claim 1, wherein spacers are fixedly disposed on opposite lateral sides of the duct, respectively, such that opposite lateral sides of the outer wing and the support wing are vertically rotatably coupled to the spacers.

3. The slim air vent for a vehicle according to claim 1, wherein a front side of the outer wing and a rear side of the support wing are rotatably connected, and the support wing is such that a length is variable during rotation of the outer wing.

4. The slim air vent for a vehicle according to claim 1, wherein the outer wing includes an upper outer wing part and a lower outer wing part vertically spaced apart from each other, and the upper outer wing part and the lower outer wing part are connected to the knob pin by the link mechanism, so that the upper outer wing part and the lower outer wing part rotate together during the rotation of the knob pin.

5. The slim air vent for a vehicle according to claim 4, wherein the support wing includes an upper support wing part rotatably connected to the upper outer wing part, and a lower support wing part rotatably connected to the lower outer wing part, wherein the upper support wing part and the lower support wing part are vertically spaced apart from each other.

6. The slim air vent for a vehicle according to claim 4, wherein the upper support wing part and the lower support wing part have an assembly structure of a cylinder and a cylinder rod moving along the cylinder, so that a length of the upper support wing part and a length of the lower support wing part are individually variable during vertical rotation of the outer wing.

7. The slim air vent for a vehicle according to claim 4, wherein the link mechanism includes a first link coupled to the one end of the knob pin, and a second link coupled to the first link and having opposite ends coupled to the upper outer wing part and the lower outer wing part, respectively, whereby during the rotation of the knob pin, the first link rotates, and during the rotation of the first link, the second link rotates the upper outer wing part and the lower outer wing part together while moving upward or downward along the rotation direction of the first link.

8. The slim air vent for a vehicle according to claim 7, wherein the outer wing and the support wing are rotatably coupled to spacers fixedly disposed on opposite lateral sides of the duct, respectively, the first link and the second link are to, at an outside of the spacers, connect the one end of the knob pin penetrating through the spacers and guide protrusions of the upper outer wing part and lower outer wing part, and each of the spacers include a first guide hole and a second guide hole spaced apart from each other in the vertical direction to guide the movement of the upper outer wing part and the lower outer wing part during the vertical movement of the second link according to the rotation of the first link.

9. The slim air vent for a vehicle according to claim 1, wherein the knob includes a coupling part coupled to a vertical rod of the inner wing, wherein the coupling part is operated to vertically move along the vertical rod during the vertical rotation of the knob and to horizontally move the vertical rod during the horizontal movement of the knob to horizontally rotate the inner wing.

10. The slim air vent for a vehicle according to claim 1, wherein the knob includes an inner knob part integrally coupled with the knob pin so as to rotate with the knob pin, and an outer knob part manipulated by a user and surrounding the inner knob part and through which the knob pin penetrates, whereby the inner knob part and the knob pin rotate together during a vertical rotation of the outer knob part, and the inner knob part and the knob pin are fixed and only the outer knob part moves in the horizontal direction during a horizontal movement of the outer knob part.

11. The slim air vent for a vehicle according to claim 10, further comprising a spring and a rubber to regulate a gap between the inner knob part and the outer knob part.

12. The slim air vent for a vehicle according to claim 1, further comprising a rubber to contact the decorative cover to regulate a gap between the outer knob part and the decorative cover and a manipulating force of the knob.

* * * * *